US008265279B2

(12) United States Patent
Youn et al.

(10) Patent No.: US 8,265,279 B2
(45) Date of Patent: Sep. 11, 2012

(54) POLARIZATION CODING QUANTUM CRYPTOGRAPHY SYSTEM

(75) Inventors: Chun-Ju Youn, Daejon (KR); Tae-Gon Noh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 422 days.

(21) Appl. No.: 12/499,050

(22) Filed: Jul. 7, 2009

(65) Prior Publication Data

US 2010/0158252 A1   Jun. 24, 2010

(30) Foreign Application Priority Data

Dec. 22, 2008   (KR) .............................. 2008-0131623

(51) Int. Cl.
*H04K 1/00* (2006.01)
(52) U.S. Cl. ....................... 380/256; 380/279
(58) Field of Classification Search ............... 726/9, 26, 726/27, 28, 29; 713/224, 201, 212, 213, 713/220, 223; 709/204, 201, 220, 227; 707/600, 707/607, 608, 609, 687, 821; 380/200, 201, 380/202, 293, 227
See application file for complete search history.

(56) References Cited

U.S. PATENT DOCUMENTS

| 6,748,081 | B1 | 6/2004 | Dultz et al. |
| 7,068,790 | B1 | 6/2006 | Elliott |
| 2005/0135620 | A1 * | 6/2005 | Kastella et al. ............... 380/256 |
| 2009/0041243 | A1 * | 2/2009 | Nambu ........................ 380/256 |
| 2010/0111303 | A1 * | 5/2010 | Finlayson et al. ............ 380/256 |

FOREIGN PATENT DOCUMENTS

| WO | WO-2007-105834 A | 9/2007 |
| WO | WO-2008-032048 A | 3/2008 |

OTHER PUBLICATIONS

K. J. Gordon et al., "A Short Wavelength GigaHertz Clocked Fiber-Optic Quantum Key Distribution System", IEEE Journal of Quantum Electronics, vol. 40, No. 7, Jul. 2004, pp. 900-908.
Nikita Yu et al., "Tunable electro-optic polarization modulator for quantum key distribution applications", Optics Communications 234 (2004) 203-210.
Charles Bennett et al., "Quantum Cryptography: Public key distribution and coin tossing", Proc. IEEE Int. Conf. on Computers, Systems and Signal Processing, Bangalore, India, pp. 175-179 (IEEE, New York, 1984).
N. Gisin, et al., "Quantum Cryptography", Reviews of Modern Physics, vol. 74, pp. 145-195 (2002).

* cited by examiner

*Primary Examiner* — Nega Woldemariam
(74) *Attorney, Agent, or Firm* — Rabin & Berdo, P.C.

(57) ABSTRACT

Provided is a polarization coding quantum cryptography system. The quantum cryptography includes a light source, a quantum channel, an optical path selector, and a path-dependent polarization selector. The light source generates a signal light. The quantum channel is used as a path to transmit the signal light to a receiver unit. The optical path selector is disposed between the light source and the quantum channel to transmit the signal light to one of a plurality of propagation paths. The path-dependent polarization selector is disposed between the optical path selector and the quantum channel. Herein, the path-dependent polarization selector is configured to determine the polarization direction of the signal light according to the propagation path of the signal light.

17 Claims, 4 Drawing Sheets

$\theta = 45°$

POLARIZATION CODING QUANTUM CRYPTOGRAPHY SYSTEM

CROSS-REFERENCE TO RELATED APPLICATIONS

This U.S. non-provisional patent application claims priority under 35 U.S.C. §119 of Korean Patent Application No. 10-2008-0131623, filed on Dec. 22, 2008, the entire contents of which are hereby incorporated by reference.

BACKGROUND OF THE INVENTION

The present invention disclosed herein relates to quantum cryptography technologies, and more particularly, to polarization coding quantum cryptography systems.

The security problems on communication networks are recently emerging as very important issues, with the rapid development of wired/wireless communication technologies and the widespread use of various communication services. The securities of communication networks are becoming increasingly important, particularly in terms of the protection of secrets and personal information related to nations, enterprises and finances. A quantum cryptography technology is recently attracting much attention as a solution to the security problems on communication networks. The quantum cryptography technology is a communication security technology that guarantees the security by the principle of quantum mechanics, one of the natural basic laws, thus making eavesdrop or interception absolutely impossible. The quantum cryptography technology is also known as a quantum key distribution (QKD) technology that is based on the laws of quantum physics such as a no-cloning theorem to distribute, in an absolutely secure way, secret keys that are used to encrypt/decrypt data transmitted between a transmitter and a receiver.

Typical quantum cryptography or quantum key distribution methods are described in detail in the review paper [N. Gisin, G. Ribordy, W. Tittel and H. Zbinden, "Quantum Cryptography", Rev. Mod. Phys. vol. 74, pp. 145-195 (2002)]. According to this paper, examples of the typical quantum cryptography or quantum key distribution methods include BB84, B92, and EPR protocols.

A quantum cryptography key distribution method, known as the BB84 protocol, is disclosed in the paper [Charles Bennett and Gilles Brassard, "Quantum Cryptography: Public key distribution and coin tossing", Proc. IEEE Int. Conf. on Computers, Systems and Signal Processing, Bangalore, India, pp. 175-179 (IEEE, New York, 1984)]. The quantum cryptography key distribution method uses four quantum states constituting two bases (e.g., photon polarization states 0°, 90°, 45° and 135°).

Specifically, a transmitter unit (Alice) randomly selects one of the two bases, randomly selects one of the two quantum states of the selected basis (a bit value of a secret key), i.e., one of '0' and '1', and transmits the selected one through a quantum channel to a receiver unit (Bob). For example, if polarization states of a single photon, i.e., two bases of (0°, 90°) and (45°, 135°) are used, in which 0° and 45° represent a bit value '0' and 90° and 135° represent a bit value '1', and if the (0°, 90°)-basis and the bit value '1' are randomly selected by the transmitter unit, the transmitter unit transmits a single photon with a polarization state of 90° through a quantum channel to the receiver unit.

Upon receiving the single photon from the transmitter unit, the receiver unit randomly selects one of two bases and uses the selected basis to measure the quantum state of the received single photon. After the measurement by the receiver unit, the transmitter/receiver units reveal their selected bases through a classical channel to each other. Herein, if the basis selected by the transmitter unit is identical to the basis selected by the receiver unit, because the measurement result of the receiver unit accords with the quantum state selected by the transmitter unit, the transmitter/receiver units come to have the same bit value.

A bit string, which is generated by repeating the above process and sifting only bit values corresponding to the case of the same basis being selected by the transmitter/receiver units, is called a sifted key. The sifted key is processed through post-processing processes such as error correction and privacy amplification, and the processed sifted key is used as a secret key.

If an eavesdropper (Eve) attempts to eavesdrop in the process, an error occurs in a sifted key obtained by the transmitter/receiver units by the basic principle of quantum mechanics. The transmitter/receiver units reveal a portion of the sifted key to each other and calculate an error rate to determine if there is an eavesdropper.

Meanwhile, it is difficult to implement an ideal single-photon light source. Therefore, four light sources generating photons of different polarization states are used to implement the BB84 protocol requiring four polarization states. Similarly, two light sources generating photons of different polarization states are used to implement the B92 protocol requiring two polarization states (for example, see ["A Short Wavelength GigaHertz Clocked Fiber-Optic Quantum Key Distribution System", IEEE JOURNAL OF QUANTUM ELECTRONICS, VOL. 40, NO. 7, JULY 2004]). However, spectrums of light sources may differ from each other because multiple light sources cannot be implemented in exactly the same way as a single light source. An eavesdropper can attempt to eavesdrop using such a spectrum difference. Therefore, a quantum cryptography system using multiple light sources is inferior in security to an ideal quantum cryptography system using a single photon.

Methods for constructing a quantum cryptography system by use of a single light source and a polarization modulator have been proposed to overcome the above technical limitation. These methods, however, are reported to be difficult to achieve stable operation characteristics.

SUMMARY OF THE INVENTION

The present invention provides quantum cryptography systems that use a signal light generated by a single light source.

The present invention also provides quantum cryptography systems that can achieve stable operation characteristics.

Embodiments of the present invention provide quantum cryptography systems that are configured to determine the polarization direction of a signal light manually according to the propagation direction of the signal light and a single light source. The quantum cryptography systems may include: a light source generating a signal light; a quantum channel used as a path to transmit the signal light to a receiver unit; an optical path selector disposed between the light source and the quantum channel to transmit the signal light to one of a plurality of propagation paths; and a path-dependent polarization selector disposed between the optical path selector and the quantum channel. Herein, the path-dependent polarization selector may be configured to determine the polarization direction of the signal light according to the propagation path of the signal light.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the specification, the dimensions of layers and regions are exaggerated for clarity of illustration. It will also be understood that when a layer (or film) is referred to as being 'on' another layer or substrate, it can be directly on the other layer or substrate, or intervening layers may also be present. Also, though terms like a first, a second, and a third are used to describe various regions and layers in various embodiments of the present invention, the regions and the layers are not limited to these terms. These terms are used only to tell one region or layer from another region or layer. Therefore, a layer referred to as a first layer in one embodiment can be referred to as a second layer in another embodiment. An embodiment described and exemplified herein includes a complementary embodiment thereof.

Figure 1:
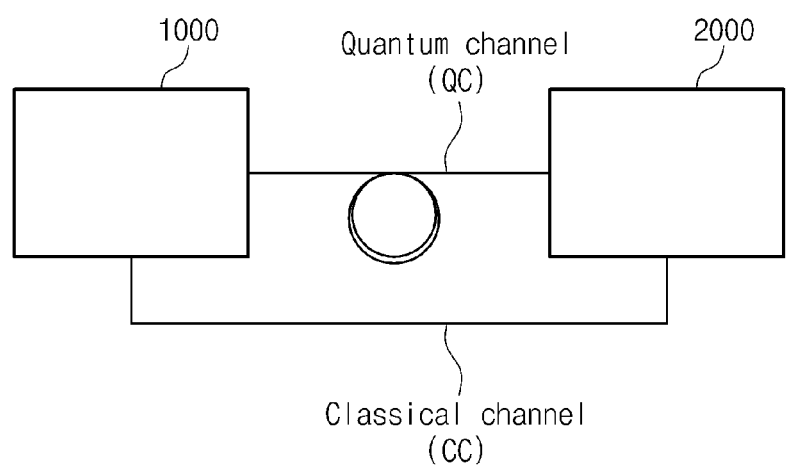
FIG. 1 is a block diagram of a quantum cryptography system according to an exemplary embodiment of the present invention.
Figure 2:
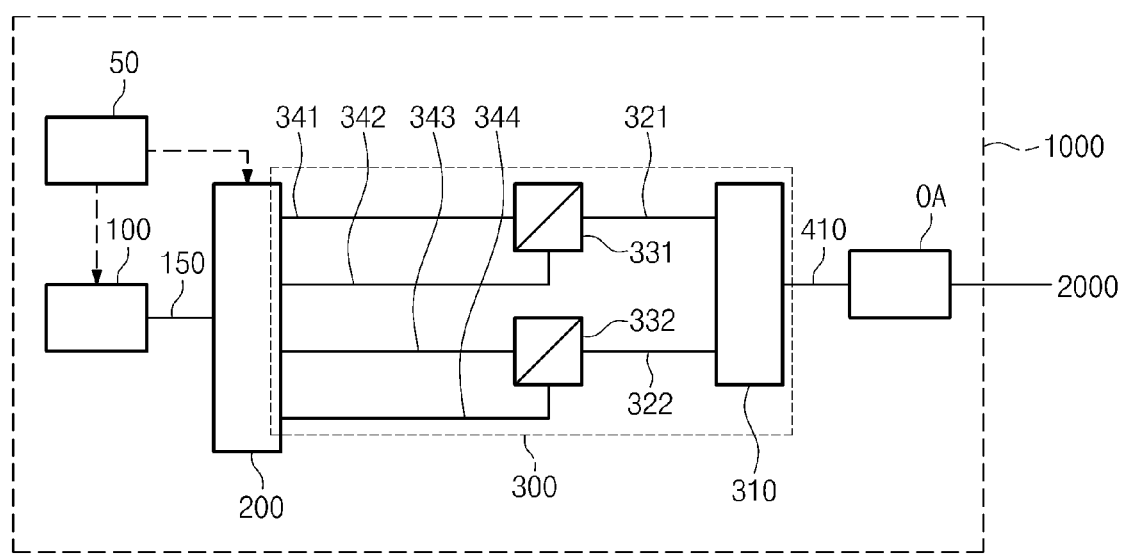
FIG. 2 is a block diagram of a transmitter unit for implementing the BB84 protocol according to an exemplary embodiment of the present invention.
Figure 3:
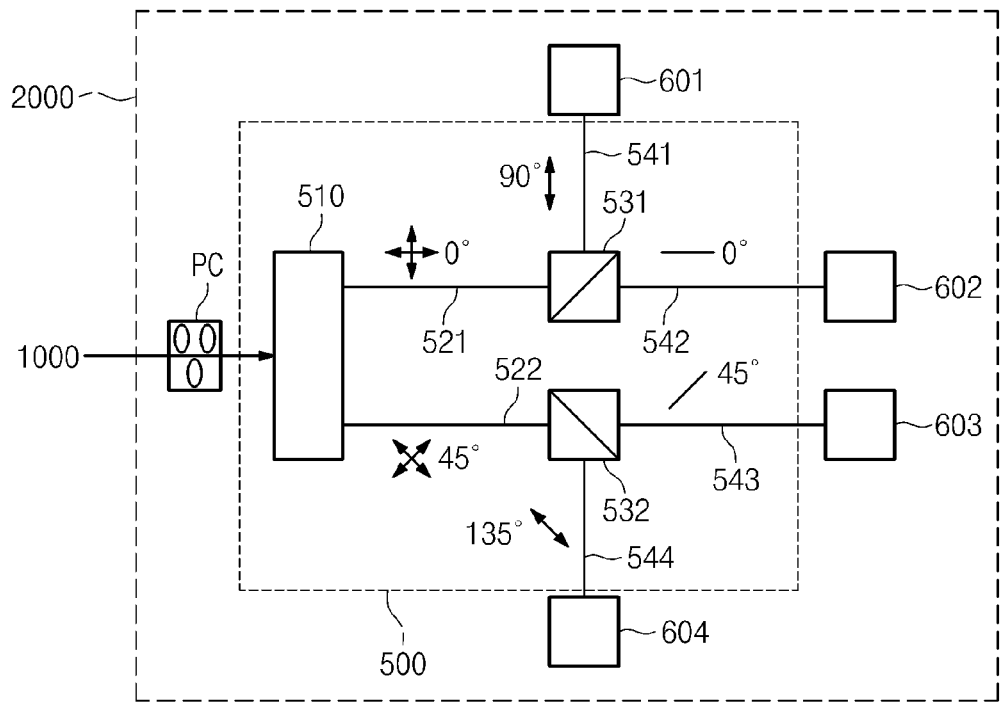
FIG. 3 is a block diagram of a receiver unit for implementing the BB84 protocol according to an exemplary embodiment of the present invention.
Figure 4:
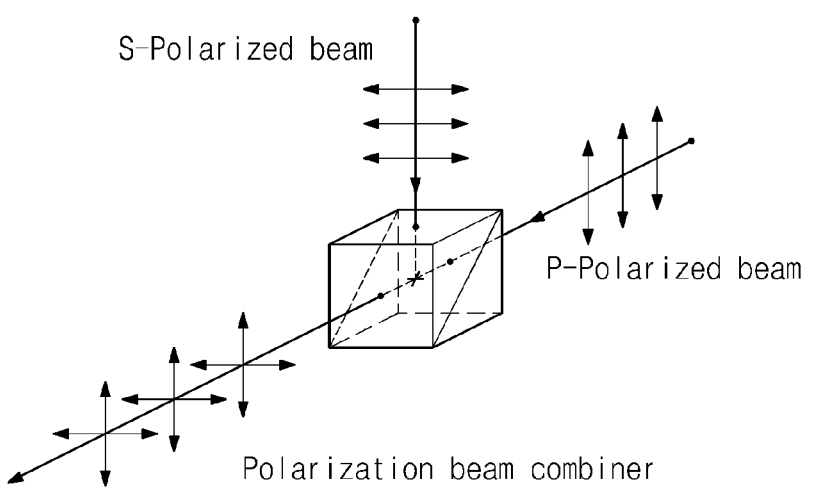
FIG. 4 is a diagram illustrating a polarization beam combiner according to an exemplary embodiment of the present invention.
Figure 5:
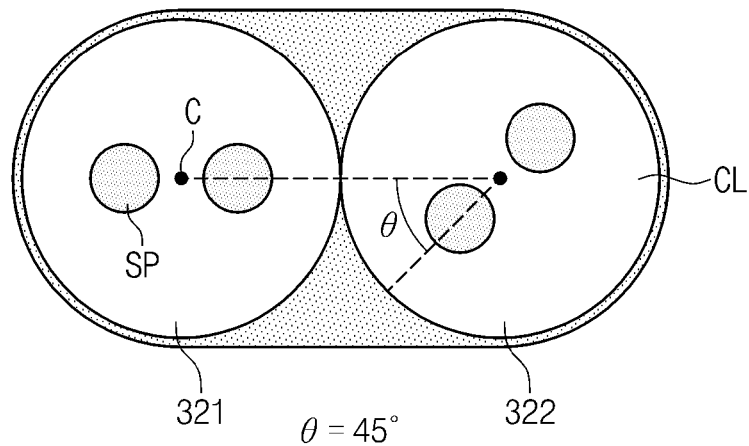
FIG. 5 is a diagram illustrating a polarization maintaining coupler according to an exemplary embodiment of the present invention.

FIG. 1 is a block diagram of a quantum cryptography system according to an exemplary embodiment of the present invention. FIG. 2 is a block diagram of a transmitter unit for implementing the BB84 protocol according to an exemplary embodiment of the present invention. FIG. 3 is a block diagram of a receiver unit for implementing the BB84 protocol according to an exemplary embodiment of the present invention. FIG. 4 is a diagram illustrating a polarization beam combiner according to an exemplary embodiment of the present invention. FIG. 5 is a diagram illustrating a polarization maintaining coupler according to an exemplary embodiment of the present invention.

Referring to FIG. 1, a quantum cryptography system according to an exemplary embodiment of the present invention includes a transmitter unit 1000 and a receiver unit 2000 that are optically connected through a quantum channel QC. The transmitter unit 1000 may include a light source 100, an optical path selector 200, and a path-dependent polarization selector 300 as illustrated in FIG. 2. The receiver unit 2000 may include a polarization-dependent path selector 500 and photon detectors 601, 602, 603 and 604 as illustrated in FIG. 3. The quantum channel QC may be an optical fiber or a free space. The transmitter unit 1000 and the receiver unit 2000 are also connected through a classical channel CC that makes possible the partial comparison of measurement results of the transmitter/receiver units.

Referring to FIG. 2, the light source 100 is configured to generate a pulsed signal light under the control of a controller 50. According to this embodiment, the light source 100 may be a single laser source that generates a linearly-polarized signal light. The signal light generated by the light source 100 may be transmitted through an optical fiber 150 to the optical path selector 200. The optical fiber 150 may be a polarization maintaining fiber.

The optical path selector 200 is configured to select the path of the signal light inputted to the path-dependent polarization selector 300. Specifically, the optical path selector 200 and the path-dependent polarization selector 300 may be connected through a plurality of optical fibers, and the path of the signal light inputted from the optical path selector 200 to the path-dependent polarization selector 300 may be selected under the control of the controller 50. This control may be achieved using at least one of mechanical means, electro-optic effects, and magneto-optic effects.

The path-dependent polarization selector 300 is configured to optically connect the quantum channel QC and the optical path selector 200 and determine the polarization state of the signal light incident to the quantum channel QC. According to this embodiment, the path-dependent polarization selector 300 includes passive devices, so that the polarization direction of the signal light inputted to the quantum channel QC is determined by the propagation path of the signal light selected by the optical path selector 200.

According to this embodiment, the path-dependent polarization selector 300 may include a polarization maintaining coupler 310, two first optical fibers 321 and 322, two polarization beam combiners 331 and 332, and four second optical fibers 341, 342, 343 and 344. The first optical fibers 321 and 322 optically connects the polarization maintaining coupler 310 and the polarization beam combiners 331 and 332, and the second optical fibers 341-344 optically connect the optical path selector 200 and the polarization beam combiners 331 and 332.

The first optical fibers 321 and 322 may be polarization maintaining fibers so that the signal light can maintain its polarization during its propagation. In the polarization maintaining coupler 310, the first optical fibers 321 and 322 are connected to have an angle θ of about 45° between their polarization axes, as illustrated in FIG. 5. Each of the polarization maintaining fibers, including the first optical fibers 321 and 322, used to implement the present invention may be a panda-type optical fiber that has two stress applying part SP spaced apart from its center core C and surrounded by a cladding layer CL, as illustrated in FIG. 5, to which the present invention is not limited.

According to an exemplary embodiment, each of the polarization beam combiners 331 and 332 may be a beam splitter that provides an inclined reflection plane on an optical path, as illustrated in FIG. 4. In this case, an s-polarized beam with a polarization direction parallel to the refection plane reflects from the reflection plane, and a p-polarized beam with a polarization direction perpendicular to the s-polarized beam penetrates the reflection plane. Accordingly, the s-polarized beam and the p-polarized beam passing through the polarization beam combiners 331 and 332 may propagate on the same optical path, as illustrated in FIG. 4. Consequently, the polarization beam combiners 331 and 332 combine beams of different polarization states onto a single optical path without a change in the polarization states. According to a modified embodiment of the present invention, optical devices capable of achieving the above object are not limited to the structure illustrated in FIG. 4, and may be used as the polarization beam combiners 331 and 332.

According to this embodiment, the polarization beam combiners 331 and 332 may be configured to have a 90° difference between the polarization directions of beams passing therethrough. To this end, the second optical fibers 341 and 342 are connected to the polarization beam combiner 331 to be used as the propagation path of a transmitting p-polarized beam and a reflecting s-polarized beam to the polarization beam combiner 331, and the second optical fibers 343 and 344 are connected to the polarization beam combiner 332 to be used as the propagation path of a transmitting p-polarized beam and a reflecting s-polarized beam to the polarization beam combiner 332. Herein, the second optical fibers 341-344 may be polarization maintaining fibers. Also, as illustrated in FIG. 5, a pair of the second optical fibers 341 and 342 may be connected respectively to different surfaces of the polarization combiner 331 so that signal lights passing through the second optical fibers 341 and 342 are combined with a 90° difference in polarization direction; and a pair of the second optical fibers 343 and 344 may be connected respectively to different surfaces of the polarization combiner 332 so that signal lights passing through the second optical fibers 343 and 344 are combined with a 90° difference in polarization direction.

According to modified embodiments, the polarization beam combiners 331 and 332 are not limited to the structure illustrated in FIG. 4, and may be any well-known optical devices that combine beams of different polarization states onto a single optical path without a substantial change in the polarization states.

In addition, an optical attenuator OA may be further disposed between the quantum channel QC and the path-dependent polarization selector 300. The optical attenuator OA may be configured to attenuate the intensity of the signal light so that it contains less than one photon per pulse. The optical attenuator OA and the polarization maintaining coupler 310 may be connected through a single-mode optical fiber.

Referring to FIG. 3, the receiver unit 2000 may include a polarization-dependent path selector 500 and photon detectors 601-604. The polarization-dependent path selector 500 may be configured to select the propagation path of a signal light inputted from the quantum channel QC. The photon detectors 601-604 may be configured to detect a signal light propagating on the propagation path selected by the polarization-dependent path selector 500. In addition, a polarization controller PC may be further disposed between the quantum channel QC and the polarization-dependent path selector 500.

Specifically, the polarization-dependent path selector 500 may be configured to transmit the signal light to one of the photon detectors 601-604 according to the polarization direction of the signal light. According to an exemplary embodiment, the polarization-dependent path selector 500 may include a polarization maintaining splitter 510, two third optical fibers 521 and 522, two polarization beam splitters 531 and 532, and four fourth optical fibers 541, 542, 543 and 544. The third optical fibers 521 and 522 optically connect the polarization maintaining splitter 510 and the polarization beam splitters 531 and 532, and the fourth optical fibers 541-544 optically connect the polarization beam splitters 531 and 532 and the photon detectors 601-604. Accordingly, a signal light transmitted from the transmitter 1000 can be detected by one of the photon detectors 601-604 after passing through the polarization maintaining splitter 510, the third optical fibers 521 and 522, the polarization beam splitters 531 and 532, and the fourth optical fibers 541-544.

The polarization maintaining splitter 510 may be configured to split the signal light between the third optical fibers 521 and 522, and the third optical fibers 521 and 522 may be connected to the polarization maintaining splitter 510 to have an angle of about 45° between their polarization axes (for example, 0° and 45° as illustrated in FIG. 3). According to this embodiment, except a difference in the propagation direction of the signal light, the polarization maintaining splitter 510 may be substantially identical to the polarization maintaining coupler 310 of the transmitter unit 1000, to which the present invention is not limited. However, it is apparent that the polarization maintaining coupler 510 may be an optical device different from the polarization maintaining splitter 310.

The polarization beam splitter 531/532 may be configured to transmit a signal light, which passes through the third optical fiber 521/522, to one of two different optical paths according to its polarization state. The two optical paths defined by the polarization beam splitter 531/532 may be defined by the fourth optical fibers 541 and 542/543 and 544. That is, the two fourth optical fibers 541 and 542/543 and 544 may be connected to the polarization maintaining splitter 531/532. Herein, the polarization beam splitter 531/532 may be an optical device described with reference to FIG. 4, so that the propagation path of the signal light may be determined according to its polarization state (i.e., 0°, 45°, 90° and 135°). That is, according to an exemplary embodiment, except a difference in the propagation direction of the signal light, the polarization beam splitter 531/532 may be an optical device that is substantially identical to the polarization beam combiner 331/332 of the transmitter unit 1000. However, according to modified embodiments, the polarization beam splitter 531/532 may be an optical device different from the polarization beam combiner 331/332.

The third optical fibers 521 and 522 and the fourth optical fibers 541-544 may be polarization maintaining fibers or single-mode optical fibers. Herein, polarization controllers may be further provided on the third optical fibers 521 and 522 or the fourth optical fibers 541-544 to control the polarization of the signal light.

Figure 6:
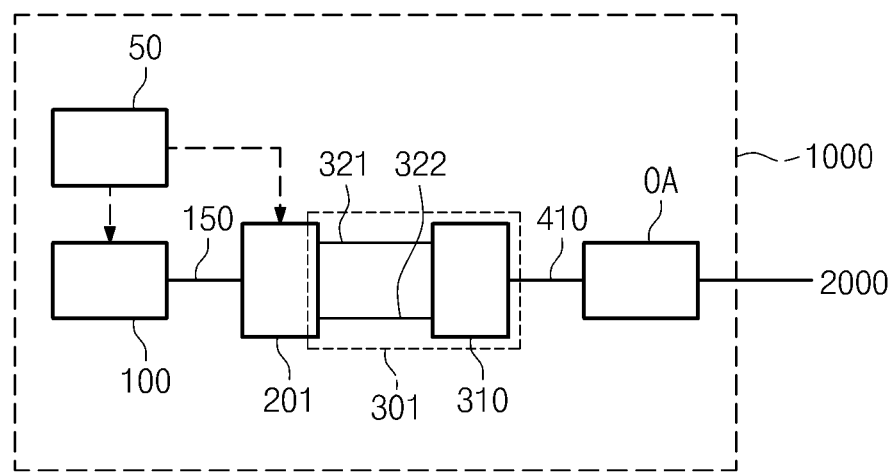
FIG. 6 is a block diagram of a transmitter unit for implementing the B92 protocol according to an exemplary embodiment of the present invention.
Figure 7:
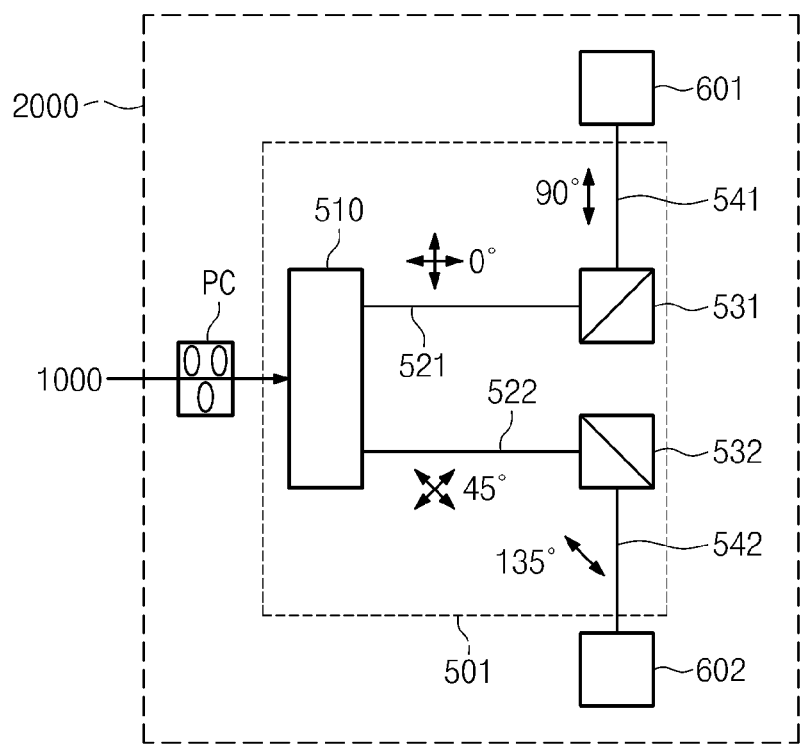
FIG. 7 is a block diagram of a receiver unit for implementing the B92 protocol according to an exemplary embodiment of the present invention.

FIG. 6 is a block diagram of a transmitter unit for implementing a B92 protocol according to an exemplary embodiment of the present invention. FIG. 7 is a block diagram of a receiver unit for implementing the B92 protocol according to an exemplary embodiment of the present invention. A description of the technical features overlapping with the embodiments of FIGS. 1 to 5 will be omitted for simplicity in description.

Referring to FIG. 6, a transmitter unit 1000 according to this embodiment may include a light source 100, an optical path selector 201, and a path-dependent polarization selector 301.

The optical path selector 201 is configured to select the path of a signal light inputted to the path-dependent polarization selector 301. The optical path selector 201 according to this embodiment differs from the optical path selector 200, which has four output ports according to the aforesaid embodiments, in that the optical path selector 201 is connected directly to two first optical fibers 321 and 322 used as output ports.

The path-dependent polarization selector 301 is configured to optically connect the quantum channel QC and the optical path selector 201 and determine the polarization state of the signal light inputted to the quantum channel QC. The path-dependent polarization selector 301 according to this embodiment may include a polarization maintaining coupler 310 and two first optical fibers 321 and 322 that connect the polarization maintaining coupler 310 and the optical path selector 201. The path-dependent polarization selector 301 according to this embodiment differs from the path-dependent polarization selector 300, which further includes the two polarization beam combiners 331 and 332 and the fourth second optical fibers 341-344 according to the aforesaid embodiments, in that the first optical fibers 321 and 322 are connected directly to the optical path selector 201.

Like the aforesaid embodiments, the first optical fibers 321 and 322 may be polarization maintaining fibers. Also, in the polarization maintaining coupler 310, the first optical fibers 321 and 322 are connected to have an angle θ of about 45° between their polarization axes, as illustrated in FIG. 5.

Referring to FIG. 7, the receiver unit 2000 according to this embodiment may include a polarization-dependent path selector 501 and two photon detectors 601 and 602. The polarization-dependent path selector 501 may be configured to transmit the signal light to one of the photon detectors 601 and 602 in accordance with the polarization direction of the signal light. The photon detectors 601 and 602 may be configured to detect a signal light propagating on the propagation path selected by the polarization-dependent path selector 501. Herein, the polarization-dependent path selector 501 may include a polarization maintaining splitter 510, two third optical fibers 521 and 522, two polarization beam splitters 531 and 532, and two fourth optical fibers 541 and 542.

According to this embodiment, the third optical fibers 521 and 522 may be configured to implement an about 45° difference in the polarization direction (for example, 0° and 45° as illustrated in FIG. 7). Likewise, the fourth optical fibers 541 and 542 may be configured to implement an about 45° difference in the polarization direction (for example, 90° and 135° as illustrated in FIG. 7).

Figure 8:
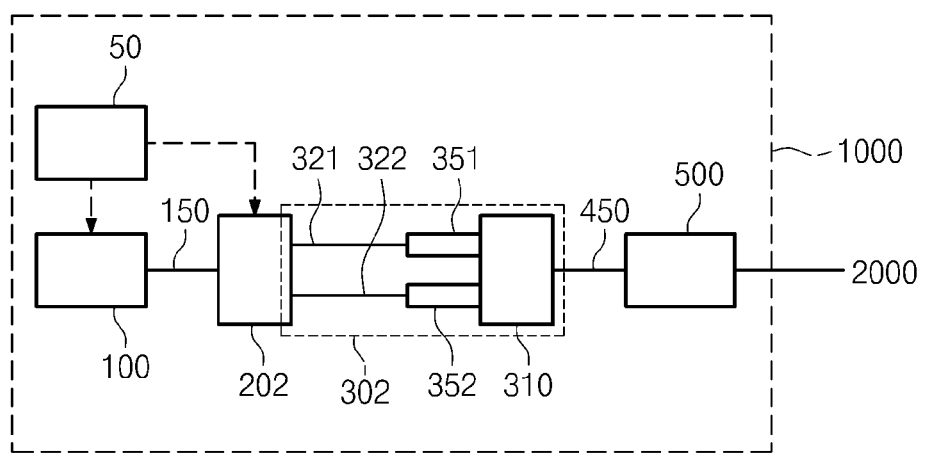
FIG. 8 is a block diagram of a transmitter unit for implementing the B92 protocol according to another exemplary embodiment of the present invention.

FIG. 8 is a block diagram of a transmitter unit for implementing the B92 protocol according to another exemplary embodiment of the present invention. A description of the technical features overlapping with the embodiment of FIG. 6 will be omitted for simplicity in description.

Referring to FIG. 8, a transmitter unit 1000 according to this embodiment may include a light source 100, an optical path selector 202, and a path-dependent polarization selector 302.

The optical path selector 202 may be configured to select the path of a signal light inputted to the path-dependent polarization selector 301, which may be identical to the optical path selector 201 described with reference to FIG. 6. The optical path selector 202 according to this embodiment differs from the optical path selector 200, which has four output ports according to the embodiment described with reference to FIG. 2, in that the optical path selector 202 is connected directly to two first optical fibers 321 and 322 used as output ports.

The path-dependent polarization selector 302 is configured to optically connect the quantum channel QC and the optical path selector 202 and determine the polarization state of the signal light inputted to the quantum channel QC. The path-dependent polarization selector 302 according to this embodiment may include a polarization maintaining coupler 310, two first optical fibers 321 and 322, and two polarizers 351 and 352.

The polarization maintaining coupler 310 may be identical to that of the embodiment described with reference to FIG. 2. Also, the first optical fibers 321 and 322 optically connect the optical path selector 202 and the polarizers 351 and 352, and may be polarization maintaining fibers or single-mode optical fibers. The polarizers 351 and 352 may be disposed between the polarization maintaining coupler 310 and the first optical fibers 321 and 322 to selectively pass only a signal light of a predetermined polarization direction. Herein, the polarizers 351 and 352 may be configured to have an angle of about 45° between their polarization axes.

As described above, the present invention distributes quantum cryptography keys by use of a signal light generated by a single light source. Therefore, the present invention can reduce the eavesdropping attempts of eavesdroppers, thus making it possible to achieve increased security in comparison with a quantum cryptography system using multiple light sources.

Also, the present invention determines the polarization of a signal light manually according to the propagation path of the signal light, thereby making it possible to achieve increased stability in comparison with a quantum cryptography system using a polarization modulator.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A quantum cryptography system comprising:
a light source generating a signal light;
a quantum channel used as a path to transmit the signal light to a receiver unit;
an optical path selector disposed between the light source and the quantum channel; and
a path-dependent polarization selector disposed between the optical path selector and the quantum channel, wherein
the optical path selector and the path-dependent polarization selector are optically connected through more than two propagation paths;
the optical path selector selects one of the propagation paths and transmits the signal light to the selected propagation path; and
the path-dependent polarization selector is configured to determine a polarization direction of the signal light according to the selected propagation path.

2. The quantum cryptography system of claim 1, wherein the optical path selector uses at least one of mechanical means, electro-optic effects, and magneto-optic effects to select the selected propagation path of the signal light.

3. The quantum cryptography system of claim 1, wherein the path-dependent polarization selector comprises:
two first optical fibers used as two of the propagation paths of the signal light; and
a polarization maintaining coupler disposed between the quantum channel and the two first optical fibers, wherein the polarization maintaining coupler is configured such that the two first optical fibers have an angle of about 45° between polarization axes thereof.

4. The quantum cryptography system of claim 3, wherein the path-dependent polarization selector comprises:
   four second optical fibers disposed between the optical path selector and the first optical fibers; and
   polarization beam combiners disposed between the first optical fibers and the second optical fibers,
   wherein each of the polarization beam combiners is connected to two of the second optical fibers having an angle of about 90° between polarization axes thereof, and ones of the second optical fibers connected to different polarization beam combiners have an angle of about 45° between polarization axes thereof.

5. The quantum cryptography system of claim 3, wherein the first optical fibers are polarization maintaining fibers connected to the optical path selector, and are connected in the polarization maintaining coupler to have an angle of about 45° between the polarization axes thereof.

6. The quantum cryptography system of claim 3, wherein the first optical fibers are polarization maintaining fibers connected to the optical path selector, and the polarization maintaining coupler comprises:
   two polarizers connected respectively to the first optical fibers; and
   an optical coupler coupling the quantum channel and the polarizers,
   wherein the polarizers have an angle of about 45° between polarization axes thereof.

7. The quantum cryptography system of claim 6, wherein four second optical fibers are disposed between the optical path selector and the first optical fibers; and
   the second optical fibers are polarization maintaining fibers connected to the optical path selector.

8. The quantum cryptography system of claim 1, wherein the path-dependent polarization selector consists of passive devices so that the polarization direction of the signal light incident to the quantum channel is determined only by a propagation direction of the signal light selected by the optical path selector.

9. The quantum cryptography system of claim 1, further comprising a controller controlling operations of the optical path selector and the light source,
   wherein the controller is configured to control the optical path selector to select the one propagation path for transmitting the signal light.

10. The quantum cryptography system of claim 1, further comprising an optical attenuator disposed between the path-dependent polarization selector and the quantum channel.

11. The quantum cryptography system of claim 10, further comprising a single-mode optical fiber connecting the optical attenuator and the path-dependent polarization selector.

12. A quantum cryptography system comprising:
   a quantum channel transmitting a signal light from a transmitter unit;
   more than two photon detectors detecting the signal light; and
   a polarization-dependent path selector disposed between the quantum channel and the photon detectors, wherein
   the polarization-dependent path selector and the photon detectors are optically connected through more than two propagation paths,
   the polarization-dependent path selector is configured to select one of the propagation paths and transmits the signal light to the selected propagation path; and
   the polarization-dependent path selector is configured to transmit the signal light to one of the photon detectors according to a polarization direction of the signal light.

13. The quantum cryptography system of claim 12, wherein the polarization-dependent path selector comprises:
   a polarization maintaining coupler receiving the signal light transmitted from the quantum channel;
   polarization beam splitters disposed between the polarization maintaining coupler and the photon detectors;
   third optical fibers connecting the polarization maintaining coupler and the polarization beam splitters; and
   fourth optical fibers connecting the polarization beam splitters and the photon detectors.

14. The quantum cryptography system of claim 13, wherein the polarization beam coupler is connected to two of the third optical fibers, which have an angle of about 45° between polarization axes thereof and are connected to the polarization maintaining coupler.

15. The quantum cryptography system of claim 13, wherein the third optical fibers are polarization maintaining fibers.

16. The quantum cryptography system of claim 13, wherein the quantum cryptography system comprises four of the photon detectors, two of the polarization beam splitters, and four of the fourth optical fibers to constitute a receiver unit of a quantum cryptography key distribution system based on a BB84 protocol.

17. The quantum cryptography system of claim 13, wherein the quantum cryptography system comprises two of the photon detectors, two of the polarization beam splitters, and two of the fourth optical fibers to constitute a receiver unit of a quantum cryptography key distribution system based on a B92 protocol.

* * * * *